United States Patent
Rusta-Sallehy et al.

(10) Patent No.: US 9,580,825 B2
(45) Date of Patent: Feb. 28, 2017

(54) ELECTROLYZER CELL STACK SYSTEM

(71) Applicant: Hydrogenics Corporation, Mississauga (CA)

(72) Inventors: Ali Rusta-Sallehy, Richmond Hill (CA); Michael Vale, Brampton (CA); David Frank, Scarborough (CA); Nathaniel Ian Joos, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 196 days.

(21) Appl. No.: 13/862,840

(22) Filed: Apr. 15, 2013

(65) Prior Publication Data

US 2013/0228456 A1 Sep. 5, 2013

Related U.S. Application Data

(63) Continuation of application No. 12/209,854, filed on Sep. 12, 2008, now Pat. No. 8,419,910, which is a (Continued)

(51) Int. Cl.
- C25B 15/02 (2006.01)
- C25B 1/06 (2006.01)
- C25B 9/06 (2006.01)

(52) U.S. Cl.
CPC ............ *C25B 15/02* (2013.01); *C25B 1/06* (2013.01); *C25B 9/06* (2013.01); *Y02E 60/366* (2013.01)

(58) Field of Classification Search
None
See application file for complete search history.

(56) References Cited

U.S. PATENT DOCUMENTS

| 2,202,313 A * | 5/1940 | Grove | G05D 16/0655 |
| | | | 137/505.42 |
| 2,426,639 A * | 9/1947 | O'Leary | F02M 59/14 |
| | | | 137/505.25 |

(Continued)

FOREIGN PATENT DOCUMENTS

| CA | 2053278 | 1/1990 |
| CA | 2460241 | 3/2003 |

(Continued)

OTHER PUBLICATIONS

Dictionary.com, "regulator," in Dictionary.com Unabridged. Source location: Random House, Inc. http://dictionary.reference.com/browse/regulator. Available: http://dictionary.reference.com. Accessed: Oct. 31, 2014.*

(Continued)

*Primary Examiner* — Harry D Wilkins, III

(57) ABSTRACT

Some embodiments of the present invention provide a balance-of-plant system and apparatus suited for regulating the operation of an electrolyzer cell stack. Specifically, in some embodiments, a balance-of-plant system and apparatus is operable to regulate the respective pressures of at least two reaction products relative to one another. Various examples are provided to demonstrate how the respective pressures of two reaction products can be regulated in relation to one another in a pressure following configuration, thereby regulating the pressure differential across an electrolyte layer according to aspects of different embodiments of the invention. Some of the examples provided also include design simplifications and alternatives that may reduce production costs of electrochemical cells configured according to aspects of different embodiments of the invention.

23 Claims, 9 Drawing Sheets

Related U.S. Application Data continuation of application No. 10/945,492, filed on Sep. 21, 2004, now abandoned.

(60) Provisional application No. 60/504,227, filed on Sep. 22, 2003.

(56) References Cited

U.S. PATENT DOCUMENTS

| | | | |
|---|---|---|---|
| 3,801,374 | A | 4/1974 | Dews et al. |
| 4,214,969 | A | 7/1980 | Lawrence |
| 4,294,683 | A | 10/1981 | Pere |
| 4,323,442 | A | 4/1982 | Lantin et al. |
| 4,988,583 | A | 1/1991 | Watkins et al. |
| 5,252,410 | A | 10/1993 | Wilkinson et al. |
| 5,419,980 | A | 5/1995 | Okamoto et al. |
| 5,566,001 | A | 10/1996 | Saidi et al. |
| 5,578,388 | A | 11/1996 | Faita et al. |
| 5,606,242 | A | 2/1997 | Hull et al. |
| 5,690,797 | A | 11/1997 | Harada et al. |
| 5,750,281 | A | 5/1998 | Washington et al. |
| 5,763,113 | A | 6/1998 | Meltser et al. |
| 5,789,094 | A | 8/1998 | Kusunoki et al. |
| 5,977,249 | A | 11/1999 | Kovar et al. |
| 5,981,098 | A | 11/1999 | Vitale |
| 6,007,933 | A | 12/1999 | Jones |
| 6,017,648 | A | 1/2000 | Jones |
| 6,066,409 | A | 5/2000 | Ronne et al. |
| 6,080,503 | A | 6/2000 | Schmid et al. |
| 6,099,984 | A | 8/2000 | Rock |
| 6,146,518 | A | 11/2000 | Fairlie et al. |
| 6,174,616 | B1 | 1/2001 | Marvin et al. |
| 6,207,312 | B1 | 3/2001 | Wynne et al. |
| 6,255,011 | B1 | 7/2001 | Fujii et al. |
| 6,261,711 | B1 | 7/2001 | Matlock et al. |
| 6,309,521 | B1 | 10/2001 | Andrews et al. |
| 6,309,773 | B1 | 10/2001 | Rock |
| 6,410,179 | B1 | 6/2002 | Boyer et al. |
| 6,451,464 | B1 | 9/2002 | Edlund et al. |
| 6,500,580 | B1 | 12/2002 | Marvin et al. |
| 6,527,921 | B2 | 3/2003 | Kirk et al. |
| 6,566,001 | B2 | 5/2003 | Yosida et al. |
| 6,619,054 | B1 | 9/2003 | Cargnelli et al. |
| 6,673,480 | B1 | 1/2004 | Wilkinson et al. |
| 7,048,839 | B2 | 5/2006 | Harad |
| 2002/0020623 | A1 | 2/2002 | Speranza et al. |
| 2002/0172852 | A1 | 11/2002 | Frank et al. |
| 2003/0031914 | A1 | 2/2003 | Frank et al. |
| 2003/0094378 | A1 | 5/2003 | Shiepe |
| 2003/0118882 | A1 | 6/2003 | Voss |
| 2003/0186106 | A1 | 10/2003 | Frank et al. |
| 2004/0131902 | A1 | 7/2004 | Frank et al. |
| 2004/0146755 | A1 | 7/2004 | Meredith et al. |

FOREIGN PATENT DOCUMENTS

| | | |
|---|---|---|
| DE | 10126723 A1 | 12/2002 |
| EP | 0425939 A1 | 5/1991 |
| EP | 0834947 | 4/1998 |
| EP | 1156546 | 7/1998 |
| EP | 1009052 | 6/2000 |
| EP | 1083616 | 3/2001 |
| EP | 1263068 | 12/2004 |
| JP | 61-227368 | 10/1986 |
| JP | 05-109415 | 4/1993 |
| JP | 07-240218 | 9/1995 |
| JP | 07-263003 | 10/1995 |
| JP | 20010338673 | 12/2001 |
| WO | 99/04446 | 1/1999 |
| WO | 00/24066 | 4/2000 |
| WO | 02-093672 | 11/2002 |

OTHER PUBLICATIONS

Grubb, W.T., and Niedrach, L.W., Batteries with Solid Ion-Exchange Membrane Electrolytes, II: Low Temperature Hydrogen Oxygen Fuel Cells, Journal of the Electrochemical Society, Feb. 1960, 107 pp. 131-135.

Hoogers, G., "Fuel Cell Technology Handbook", CRC Press LLC, Boca Raton, Florida, 2003, ISBN: 0-8493-0877-1, pp. 4.1-4.27.

\* cited by examiner

ELECTROLYZER CELL STACK SYSTEM

PRIORITY CLAIM

This is a continuation application of U.S. application Ser. No. 12/209,854 filed on Sep. 12, 2008 issued as U.S. Pat. No. 8,419,910 on Apr. 16, 2013, which is a continuation of U.S. application Ser. No. 10/945,492 filed on Sep. 21, 2004, which claims the benefit of U.S. Application Ser. No. 60/504,227 filed on Sep. 22, 2003. Application Ser. Nos. 12/209,854; 10/945,492 and 60/504,227 are hereby incorporated by reference.

The invention relates to electrolyzer cells and, in particular to a balance-of-plant system and apparatus suited for regulating the operation of an electrolyzer cell stack.

BACKGROUND OF THE INVENTION

An electrolyzer cell is a type of electrochemical device that uses energy to dissociate a compound liquid into its components. For example, water can be dissociated into hydrogen and oxygen (e.g. $H_2O \rightarrow H_2+O_2$).

Generally, an electrolyzer includes an anode, a cathode and an electrolyte arranged between the anode and cathode. The specific arrangement of a particular electrolyzer cell is dependent upon the components, materials and technology employed. For example, a Proton Exchange Membrane (PEM) electrolyzer cell includes a thin polymer membrane arranged between an anode and a cathode.

In practice, a number of electrolyzer cells are arranged into a stack to produce sizable amounts of one or more of the components of a compound liquid. To this end, the electrolyzer cell stack is included in a module that includes a suitable combination of supporting elements, collectively termed a balance-of-plant system, which is specifically configured to maintain operating parameters and functions for the electrolyzer cell stack. Example functions of a balance-of-plant system include the maintenance and regulation of various pressures, temperatures and flow rates.

SUMMARY OF THE INVENTION

According to aspects of an embodiment of the invention there is provided a balance-of-plant system, suited for regulating the operation of an electrolyzer cell stack having at least one electrolyzer cell, including: a first pressure regulator for regulating a first pressure of a first reaction product; a pressure following device having: a pressure sensor for measuring the first pressure and providing a signal including information about a value of the first pressure; and, a second pressure regulator for regulating a second pressure of a second reaction product relative to the first pressure using the signal from the pressure sensor.

In some embodiments, the first and second pressures correspond to pressures on respective anode and cathode sides of the electrolyzer cell.

In some embodiments, the balance-of-plant system also includes: a hydrogen collection device; and, an oxygen collection device; wherein the first and second pressures correspond to pressures of hydrogen and oxygen produced by the electrolyzer cell stack.

According to aspects of another embodiment of the invention there is provided a balance-of-plant system, suited for regulating the operation of an electrolyzer cell stack having at least one electrolyzer cell, including: a controller having a computer readable program code means for causing a first pressure of a first reaction product to be followed by a second pressure of a second reaction product, the computer readable code means including: instructions for regulating the first pressure; instructions for polling a pressure sensor operable to sense the first pressure; and, instructions for regulating the second pressure relative to the first pressure. In some embodiments the controller is comprised of at least one of a centralized control system and a distributed control system.

In some embodiments the balance-of-plant system also includes: a first pressure regulator for regulating the first pressure; a pressure sensor for measuring the first pressure; and, a second pressure regulator for regulating the second pressure. In some embodiments, the first pressure regulator comprises a combination of valves, mechanical actuators and electronic actuators arranged to regulate the first pressure. In some embodiments, the second pressure regulator also comprises a combination of valves, mechanical actuators and electronic actuators arranged to regulate the second pressure.

According to aspects of another embodiment of the invention there is provided an electrochemical cell stack module including: at least one electrochemical cell in which at least two pressures, of at least two respective gases, are controllable; and, a pressure following device that is operable to control one of the two pressures relative to the other. In some embodiments the pressure following device includes: a pressure sensor for measuring/sensing one of the two pressures and providing measured/sensed information; and, a pressure regulator connectable to accept measured/sensed information from the pressure sensor and to control the other of the two pressures relative to the measured/sensed information.

According to aspects of another embodiment of the invention there is provided an electrolyzer cell module including: a controller having a computer readable program code means for causing a first pressure of a first reaction product to be regulated relative to a second pressure of a second reaction product, the computer readable code means including: instructions for regulating the second pressure; instructions for measuring/sensing the second pressure; and, instructions for regulating the first pressure relative to the second pressure.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings that illustrate aspects of embodiments of the present invention and in which.

DETAILED DESCRIPTION OF THE INVENTION

Some embodiments of the present invention provide a balance-of-plant system and apparatus suited for regulating the operation of an electrolyzer cell stack. Specifically, in some embodiments, a balance-of-plant system and apparatus is operable to regulate the respective pressures of at least two reaction products relative to one another. Various examples are provided below to demonstrate how the respective pressures of two reaction products can be regulated in relation to one another in a pressure following configuration, thereby regulating the pressure differential across an electrolyte layer. Some of the examples provided below also include design simplifications and alternatives that may reduce production costs of electrochemical cells configured according to aspects of different embodiments of the invention.

There are a number of different electrochemical cell technologies and, in general, this invention is expected to be applicable to all types of electrochemical cells. Very specific example embodiments of the invention have been developed for use with Proton Exchange Membrane (PEM) electrolyzer cells. Various other types of electrolyzer cells also include, without limitation, Solid Polymer Water Electrolyzers (SPWE). Similarly, various types of fuel cells include, without limitation, Alkaline Fuel Cells (AFC), Direct Methanol Fuel Cells (DMFC), Molten Carbonate Fuel Cells (MCFC), Phosphoric Acid Fuel Cells (PAFC), Solid Oxide Fuel Cells (SOFC) and Regenerative Fuel Cells (RFC).

Figure 1:
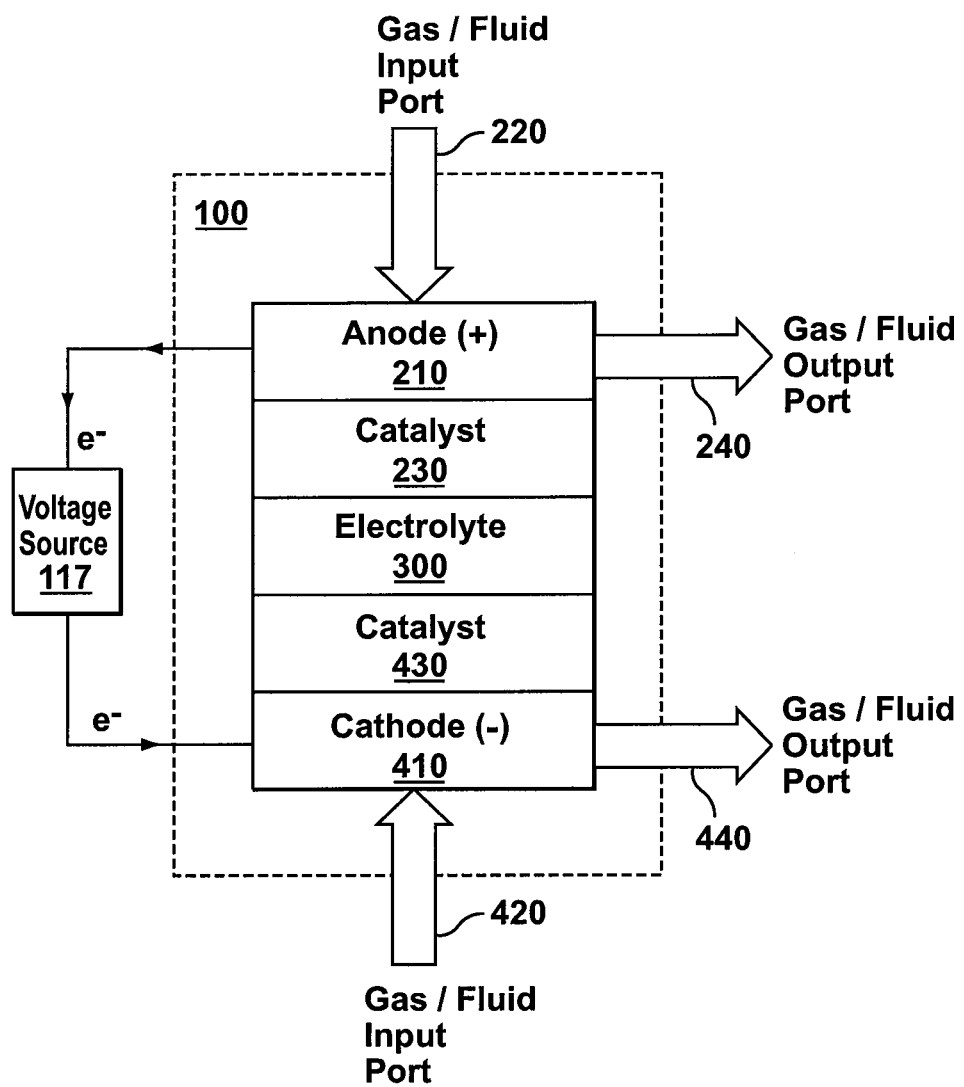
FIG. 1 is a simplified schematic drawing of an electrolyzer cell.

Referring to FIG. 1, shown is a simplified schematic diagram of a Proton Exchange Membrane (PEM) electrolyzer cell, simply referred to as electrolyzer cell 100 hereinafter, that is described herein to illustrate some general considerations relating to the operation of electrochemical cells. It is to be understood that the present invention is applicable to various configurations of electrochemical cell modules that each include one or more electrochemical cells.

The electrolyzer cell 100 includes an anode electrode 210 and a cathode electrode 410. The anode electrode 210 includes a water input port 220 and a water/oxygen output port 240. Similarly, the cathode electrode 410 includes a water input port 420 and a water/hydrogen output port 440. An electrolyte membrane 300 is arranged between the anode electrode 210 and the cathode electrode 410.

The electrolyzer cell 100 also includes a first catalyst layer 230 arranged between the anode electrode 210 and the electrolyte membrane 300, and a second catalyst layer 430 arranged between the cathode electrode 410 and the electrolyte membrane 300.

In order to energize the electrolyzer cell 100, a voltage source 117 is coupled between the anode and cathode electrodes 210, 410.

In operation, water is introduced into the anode electrode 210 via the water input port 220. The water is dissociated electrochemically according to reaction (1), given below, in the presence of the electrolyte membrane 300 and the first catalyst layer 230.

$$H_2O \rightarrow 2H^+ + 2e^- + \tfrac{1}{2}O_2 \qquad (1)$$

The chemical products of reaction (1) are hydrogen ions (i.e. cations), electrons and oxygen. The hydrogen ions pass through the electrolyte membrane 300 to the cathode electrode 410 while the electrons are drawn through the voltage source 117. Water containing dissolved oxygen molecules is drawn out through the water/oxygen output port 240.

Simultaneously, additional water is introduced into the cathode electrode 410 via the water input port 420 in order to provide moisture to the cathode side of the membrane 300.

The hydrogen ions (i.e. protons) are electrochemically reduced to hydrogen molecules according to reaction (2), given below, in the presence of the electrolyte membrane 300 and the second catalyst layer 430. That is, the electrons and the ionized hydrogen atoms, produced by reaction (1) in the anode electrode 210, are electrochemically consumed in reaction (2) in the cathode electrode 410.

$$2H^+ + 2e^- \rightarrow H_2 \qquad (2)$$

The water containing dissolved hydrogen molecules is drawn out through the water/hydrogen output port 440. The electrochemical reactions (1) and (2) are complementary to one another and show that for each oxygen molecule ($O_2$) that is electrochemically produced two hydrogen molecules ($H_2$) are electrochemically produced.

Although only one electrolyzer cell is illustrated in FIG. 1, it is commonly understood that in practice a number of electrochemical cells, all of one type, can be arranged in stacks having common elements, such as process gas/fluid feeds, drainage, electrical connections and regulation devices. That is, an electrochemical cell module is typically made up of a number of singular electrochemical cells connected in series to form an electrochemical cell stack. The electrochemical cell module also includes a suitable combination of structural elements, mechanical systems, hardware, firmware and software that is employed to support the function and operation of the electrochemical cell stack. Such items include, without limitation, piping, sensors, regulators, current collectors, seals, insulators, actuators, switches and electromechanical controllers.

Figure 2:
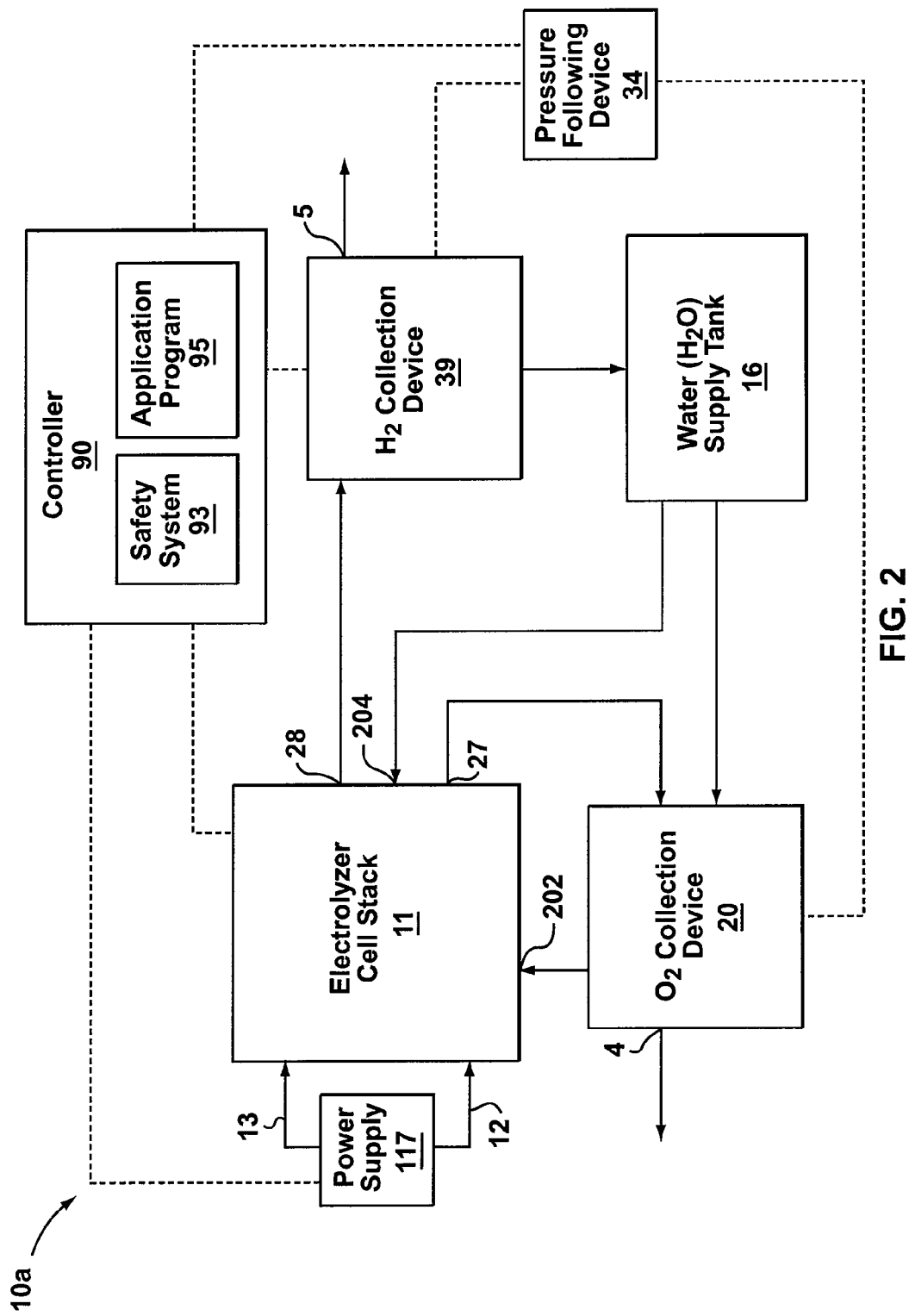
FIG. 2 is a simplified schematic drawing of an electrolyzer cell module according to aspects of an embodiment of the invention.

Referring now to FIG. 2, illustrated is a simplified schematic diagram illustrating an electrolyzer cell module 10a that is configured to dissociate water ($H_2O$) into hydrogen ($H_2$) and oxygen ($O_2$). Those skilled in the art will appreciate that an electrolyzer cell module includes a suitable combination of supporting elements, collectively referred to as a balance-of-plant system, and shown in FIG. 2 are only those balance-of-plant elements necessary to describe aspects of this embodiment of the invention.

Those skilled in the art will appreciate that shown in FIG. 2 are only those balance-of-plant elements necessary to describe aspects of this example embodiment of the invention. Generally, balance-of-plant elements can be roughly divided into two groups. A first group may be defined as a suitable combination of supporting apparatus and electromechanical systems that includes, without limitation, elements such as heaters, filters, pumps, humidifiers, valves and the like. A second group may be defined as a suitable combination of control and sensor systems that includes, without limitation, sensors, switches, valves, hardware, software, firmware and the like.

In some embodiments, the control and sensor systems include a centralized control system including for example a microcontroller and/or a computer program readable code means for monitoring and regulating the operation of an electrolyzer cell module, including portions of the supporting apparatus and electromechanical systems. In alternative embodiments, distributed control systems/controllers are provided along with or in place of a centralized control system. Generally, the sensors and the switches are electronically coupled to the aforementioned centralized and/or distributed control systems, which process sensor readings and signal the switches and other electromechanical devices accordingly in order to regulate and in some cases shut down an electrolyzer cell module.

With specific reference to FIG. 2, the electrolyzer cell module 10a includes a controller 90 that is used to manage the operations of the electrolyzer cell module 10a. Although the controller 90 is specifically shown to be connected to a number of elements included in the electrolyzer cell module 10a of FIG. 2, those skilled in the art will appreciate that a controller can be connected to any suitable combination of elements included in an electrolyzer cell module. Moreover, as also shown in FIG. 2, the controller 90 includes a modified safety system 93 and at least one application program 95 used to manage the normal operations of the electrolyzer cell module 10a. Specifically, in the present embodiment of the invention the controller 90 includes memory storing a computer program readable code means having instructions for the modified safety system 93 and the at least one application program 95.

The electrolyzer cell module 10a has an electrolyzer cell stack 11 that includes one or more PEM electrolyzer cells (not shown). Each PEM electrolyzer cell includes an electrolyte membrane arranged between an anode electrode and a cathode electrode as schematically illustrated in FIG. 1. The electrolyzer cell stack 11 has a cathode inlet port 204, a cathode outlet port 28, an anode inlet port 202 and an anode outlet port 27. The cathode inlet and outlet ports 204, 28 are fluidly connected to each of the respective cathode electrodes included in the electrolyzer cell stack 11. Similarly, the anode inlet and outlet ports 202, 27 are fluidly connected to each of the respective anode electrodes included in the electrolyzer cell stack 11. The electrolyzer cell stack 11 also includes respective electrical connections 12, 13 to the anode and cathode terminals of the electrolyzer cell stack 11.

With further reference to FIG. 2, the electrolyzer cell module 10a also includes a power supply 117, a water supply tank 16, a hydrogen collection device 39, an oxygen collection device 20 and a pressure following device 34.

The power supply 117 is coupled across the electrical connections 12, 13 to energize the electrolyzer cell stack 11, as described above. In some embodiments, the power supply 117 is, without limitation, one of a voltage source and a current source.

The oxygen collection device 20 includes an output port 4; another output port and two input ports. In some embodiments, the output port 4 serves as a tap for oxygen collected by the oxygen collection device 20, and is also connectable to other downstream components (not shown). The other output port is coupled to provide water to the anode inlet port 202, and one of the input ports is coupled to receive a combination of water and oxygen from the anode outlet port 27. The other input port is coupled to receive water from the water supply tank 16. That is, according to this specific example, water is provided to the electrolyzer cell stack 11 from the water supply tank 16 via the oxygen collection device 20, which also recycles water received back from the electrolyzer cell stack 11. Optionally, as is illustrated in FIG. 2, the water supply tank 16 is also coupled to the cathode inlet port 204 of the electrolyzer cell stack 11 to hydrate the respective cathode sides of the membranes included in the electrolyzer cell stack 11. This optional connection is not provided in the examples described below with reference to FIGS. 3-7C.

The hydrogen collection device 39 includes an output port 5; another output port and an input port. In some embodiments, the output port 5 serves as a tap for hydrogen collected by the hydrogen collection device 39, and is also connectable to other downstream components (not shown). The input of the hydrogen collection device 39 is coupled to the cathode outlet port 28 to accept a combination of water and hydrogen from the electrolyzer cell stack 11. The other output port is coupled to the water supply tank 16 to return water separated from hydrogen during operation.

In some embodiments, the hydrogen and oxygen collection devices 39, 20 each include a condenser, such as, for example, the apparatus described in the applicant's issued U.S. Pat. No. 6,619,054, which is hereby incorporated by reference.

In some embodiments, the hydrogen collection device 39 has a volume that is about twice the volume of the oxygen collection device 20. This difference in size accommodates the relative rates of hydrogen and oxygen evolution that will occur according to reactions (1) and (2) described above.

With further reference to FIG. 2, the pressure following device 34 is coupled between the hydrogen collection device 39 and the oxygen collection device 20. The pressure of the oxygen is a reasonable approximation of the pressure on the respective anode sides of the membranes included in the electrolyzer cell stack 11; and, similarly, the pressure of the hydrogen is a reasonable approximation of the pressure on the respective cathode sides of the membranes included in the electrolyzer cell stack 11. The pressure following device 34 measures/senses pressure in one and adjusts the pressure in the other relative to measured/sensed pressure, thereby regulating the pressure differential across the respective membranes within the electrolyzer cell stack 11. Moreover, although the pressure following device 34 is specifically coupled between the hydrogen and oxygen collection devices 39, 20, in alternative arrangements the pressure following device 34 can be placed between at any two points around the electrolyzer cell stack 11 that provide a reasonable measure of the internal pressures within the electrolyzer cell stack 11 and a control point for those pressures so that the pressure differential across the membranes can be regulated. Various configurations and alternative arrangements for the pressure following device 34 are described in detail below with reference to FIGS. 3-7C.

In some embodiments, the pressure following device includes, without limitation, a pressure sensor, a dome-loaded pressure valve, a negative bias regulator, a positive bias regulator and an electronically actuated pressure regulator.

The operation of the electrolyzer cell module 11 (in FIG. 2) is similar to that of the electrolyzer cell 100 (in FIG. 1). To briefly reiterate, the power supply 117 supplies the requisite energy for reactions (1) and (2). Oxygen is produced in the anode electrodes according to reaction (1) and then a combination of water and oxygen flows out of the anode outlet port 27 into the oxygen collection device 20 where the oxygen is separated from the water. Hydrogen is produced in the cathode electrodes according to reaction (2) and then a combination of water and hydrogen flows out of the cathode outlet port 28 into the hydrogen collection device 39 where the hydrogen is separated from the water.

The pressure following device 34 is operable in at least two modes of operation. In a first mode of operation, the hydrogen pressure is measured/sensed by the pressure following device 34 and the oxygen pressure is regulated to a relative value of the hydrogen pressure. In a second mode of operation, the oxygen pressure is measured/sensed by the pressure following device 34 and the hydrogen pressure is regulated to a relative value of the oxygen pressure.

In either mode of operation, a pressure, hereinafter referred to as a set pressure, that is set relative to a measured/sensed pressure, can be regulated to be higher than the measured/sensed pressure, lower than the measured/sensed pressure or approximately equal to the measured/sensed pressure. In some embodiments, a set pressure is regulated to be slightly lower than a corresponding measured/sensed pressure. For reasons described in further detail below, this is preferable in situations where the measured/sensed pressure is of a reaction product that is to be generated in a relatively pure form. Those skilled in the art will also appreciate that the measured/sensed pressure is not left unregulated but is regulated independently of the set pressure. That is, respective pressures related to various reaction products are set relative to one independently regulated pressure of the system.

For example, if the electrolyzer cell module 10a shown in FIG. 2 is operated to produce relatively pure hydrogen, then the hydrogen pressure in the cathode electrodes is regulated to be slightly greater than the oxygen pressure in the anode electrodes. This can be accomplished by at least two different methods according to aspects of various embodiments of the invention. In a first method the hydrogen pressure is regulated independently (e.g. to approximately 100 psig) and the pressure following device 34 measures/senses the hydrogen pressure and regulates the oxygen pressure accordingly to a lower value (e.g. to approximately 98 psig). In a second method the oxygen pressure is regulated independently (e.g. to approximately 97 psig) and the pressure following device 34 measures/senses the oxygen pressure and regulates the hydrogen pressure accordingly to a higher value (e.g. to approximately 99 psig). Both methods are examples of respective pressure following configurations according to aspects of various embodiments of the invention.

In an alternative example, if the electrolyzer cell module shown in FIG. 2 is operated to produce relatively pure oxygen, then the hydrogen pressure in the cathode electrodes is regulated to be slightly lower than the oxygen pressure in the anode electrodes. To that end, this may be accomplished by at least two different methods according to aspects of various embodiments of the invention. In a third method, the hydrogen pressure is regulated independently and the oxygen pressure follows at a higher value via the operation of the pressure following device 34. Similarly, in a fourth method, the oxygen pressure is regulated independently and the hydrogen pressure follows at a lower value via the operation of the pressure following device 34. Again, both the third and fourth methods are examples of respective pressure following configurations according to aspects of various embodiments of the invention.

In another alternative example, the hydrogen and oxygen pressures can be regulated to be approximately equal to one another as well. To that end, this may be accomplished by at least two different methods according to aspects of various embodiments of the invention. In a fifth method, the hydrogen pressure is regulated independently and the oxygen pressure follows via the operation of the pressure following device 34. Similarly, in a sixth method, the oxygen pressure is regulated independently and the hydrogen pressure follows via the operation of the pressure following device 34. Again, both the fifth and sixth methods are examples of respective pressure following configurations according to aspects of various embodiments of the invention.

With respect to PEM electrolyzer cells, regardless of which pressure is higher, the relative differential pressure across a membrane is preferably regulated to be small. In theory, a high differential pressure may be useful in some instances, however, since the membrane for a PEM electrolyzer cell is very thin, the membrane is susceptible to rupturing if the differential pressure is too high. Moreover, a relatively high-pressure differential will typically have an adverse effect on the durability and lifetime of a membrane, even if it does not cause a rupture or tear.

In some circumstances relatively pure production of gases is not absolutely required and an electrolyzer cell module can be adapted to reduce costs by replacing some elements with cheaper complementary elements.

For example, an electrolyzer cell module can be simplified and its total cost may be reduced if one of an oxygen detector and a hydrogen detector can be left off the list of elements included in the balance-of-plant system. By employing at least one of these detectors, a balance-of-plant system can be configured to check for irregularities, such as leaks of one reactant product into a second reactant product stream. However, both types are detectors are not required in an electrolyzer cell module to accomplish this diagnostic function. If the hydrogen pressure is normally regulated to be higher than the oxygen pressure, then, even if there is an irregularity (e.g. a leak), a detectably large amount of hydrogen will leak into the oxygen stream before oxygen leaks into the hydrogen stream. Such an electrolyzer cell module may only require a hydrogen detector somewhere along the oxygen lines, as long as the hydrogen pressure is slightly higher than the oxygen pressure.

Moreover, such an electrolyzer cell module will produce a relatively pure hydrogen stream since during normal operation oxygen will be less likely to diffuse into the hydrogen stream because the hydrogen pressure is normally higher than the oxygen pressure. By contrast, the oxygen stream will likely contain trace amounts of hydrogen during normal operation since some hydrogen will diffuse into the oxygen stream as a result of the aforementioned pressure differential. However, oxygen containing trace amounts of hydrogen is not harmful in some hydrogen fuel cells and, thus, the oxygen stream can be used for such applications without further processing. Alternatively, an electrolyzer cell module that is configured to provide relatively pure oxygen may have a preferably higher oxygen pressure than a hydrogen pressure, which would in turn reduce the need for a hydrogen detector.

Continuing with the same example, the pressure differential can be regulated by employing a pressure following configuration according to aspects of an embodiment of the invention. In some embodiments, a positive bias pressure regulator is employed when the set pressure is higher than the measure/sensed pressure. Alternatively, in other embodiments, a negative bias pressure regulator is employed when the set pressure is lower than the measured/sensed pressure.

Figure 3:
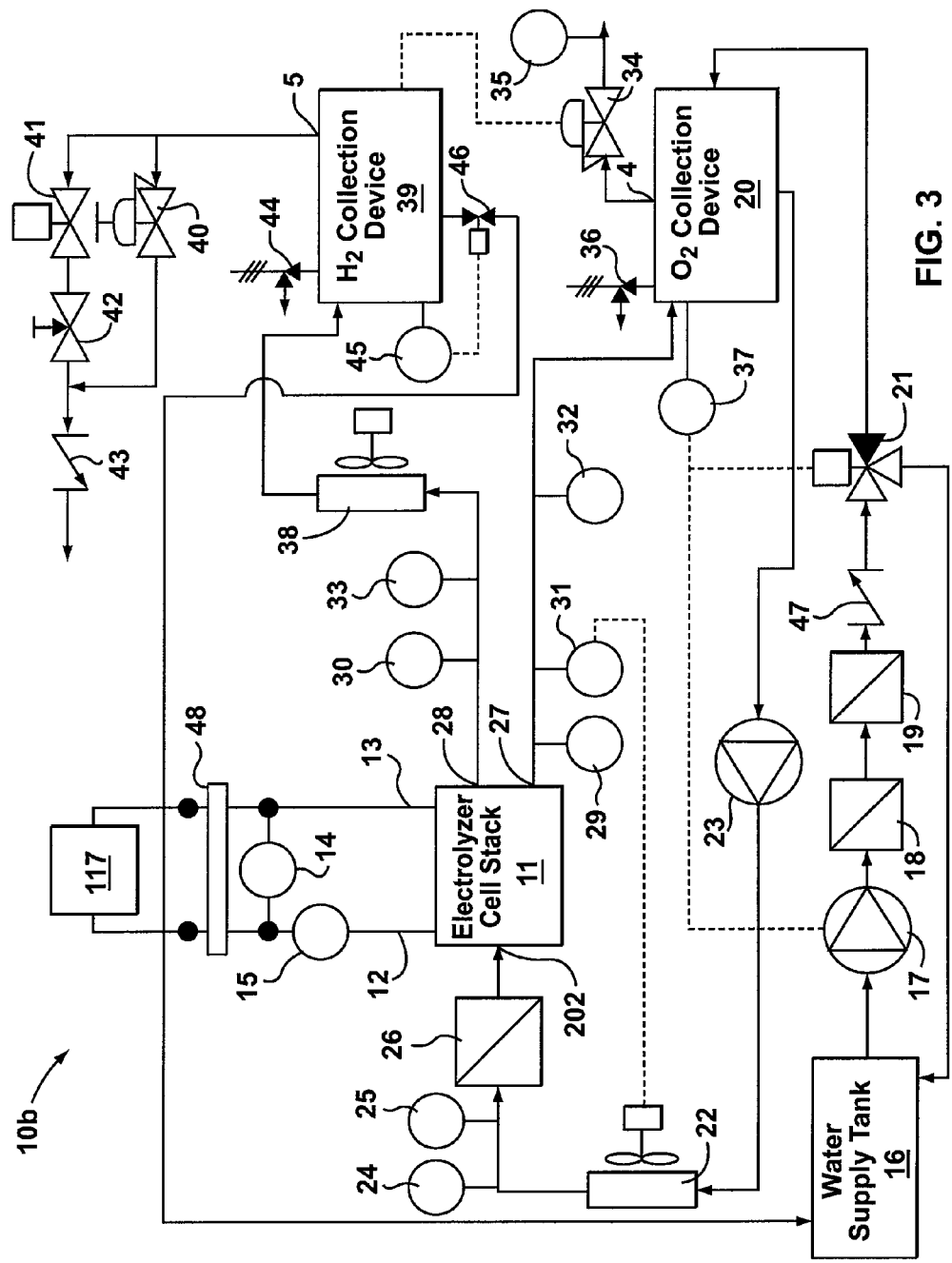
FIG. 3 is a first detailed schematic drawing of an electrolyzer cell module according to aspects of an embodiment of the invention.

Referring now to FIG. 3, illustrated is a first detailed schematic drawing of an electrolyzer cell module 10b according to aspects of an embodiment of the invention. The electrolyzer cell module 10b (shown in FIG. 3) is configured to dissociate water ($H_2O$) into hydrogen ($H_2$) and oxygen ($O_2$), and includes the same elements as the simplified electrolyzer cell module 10a (shown in FIG. 2). In particular, the electrolyzer cell module 10b includes the electrolyzer cell stack 11 with the various aforementioned various inlet and outlet ports 202, 27, 28 and the respective electrical connections 12, 13 to the anode and cathode terminals of the electrolyzer cell stack 11. The electrolyzer cell module 10b also includes the power supply 117, the water supply tank 16, the hydrogen collection device 39, the oxygen collection device 20 and the pressure following device 34. However, these elements are not directly connected to one another as described above. Instead, a number of balance-of-plant elements are connected between each of the aforementioned elements. Those skilled in the art will appreciate that the electrolyzer cell module 10b also includes a controller (not shown) similar to the controller 90 illustrated in FIG. 2, which is connected to a suitable combination of elements; however, this controller has not been illustrated for the sake of simplicity.

The balance-of-plant elements, introduced in FIG. 3, can be roughly divided into two groups. A first group may be defined as a suitable combination of supporting apparatus and electromechanical systems that includes, without limitation, elements such as heaters, filters, pumps, humidifiers, valves, and the like. A second group may be defined as a suitable combination of control and sensor systems that include, without limitation, sensors, switches, valves, hardware, software, firmware and the like.

In some embodiments, the control and sensor systems include a centralized control system (not shown) including for example a microcontroller and/or a computer program readable code means for monitoring and regulating the operation of an electrolyzer cell module, including portions of the supporting apparatus and electromechanical systems. In alternative embodiments, distributed control systems/controllers are provided with or in place of a centralized control system. Generally, the sensors and the switches are electronically coupled to the aforementioned centralized and/or distributed control systems, which process sensor readings and signal the switches and other electromechanical devices accordingly in order to regulate and in some cases shut down the electrolyzer cell module.

Again, the power supply 117 is coupled to the electrical connections 12, 13 of the electrolyzer cell stack 11 to energize the electrolyzer cell stack 11. A stack disconnect device 48 is also coupled between the electrical connections 12, 13 of the electrolyzer cell stack 11 and the power supply 117. Additionally, a current 15 and a voltage sensor 14 are appropriately arranged between the stack disconnect device 48 and the power supply 117 to measure the current drawn by the electrolyzer cell stack 11 and the voltage across the electrical connections 12, 13.

The stack disconnect device 48 is operable between two states. In a first state, the stack disconnect device 48 electrically couples the power supply 117 is to the electrolyzer cell stack 11. In a second state, the stack disconnect device 48 electrically isolates the power supply from the electrolyzer cell stack 11. In some embodiments, switching the stack disconnect device 48 between the two states is, for example, controlled by a central and/or local distributed control system, which may use readings from the current and voltage sensors 15, 14.

The anode and cathode outlet ports 27, 28 of the electrolyzer cell stack 11 are respectively connected to the oxygen and hydrogen collection devices 20, 39 through respective combinations of balance-of-plant elements.

Specifically, in this example embodiment, there is a first pressure sensor 29, a temperature sensor 31 and a first temperature safety switch 32 arranged along the fluid pathway from the anode outlet port 27 to the oxygen collection device 20. The first temperature safety switch 32 is operable to send an alarm signal to a centralized and/or distributed control system if the temperature of the stream of oxygen and water exiting the anode outlet port 27 reaches a predetermined high value. In some embodiments, the first temperature safety switch 32 is configured to override and halt the operation of the electrolyzer cell module 10a in the event that the temperature is too high, which may imply that there is a severe problem with the electrolyzer cell module 10a.

Similarly, in this very specific example embodiment, there is a second pressure sensor 30, a first pressure safety switch 33 and a first heat exchanger 38 arranged along the fluid pathway from the cathode outlet port 28 to the hydrogen collection device 39. The first pressure safety switch 33 is operable to send an alarm signal to a central and/or distributed control system if the pressure of the stream of hydrogen and water exiting the cathode outlet port 28 reaches a predetermined high value. In some embodiments, the first pressure safety switch 33 is configured to override and halt the operation of the electrolyzer cell module 10a in the event that the pressure is too high, which may imply that there is a severe problem with the electrolyzer cell module 10a. The first heat exchanger 38 is used to cool the stream of hydrogen and water exiting the cathode outlet port 28, thereby initiating condensation of the water to separate it from the hydrogen within the hydrogen collection device 39.

The anode inlet port 202 of the electrolyzer cell stack 11 is connected to receive water from the oxygen collection device 20 through a respective combination of balance-of-plant elements as well. Specifically, a circulation pump 23, a second heat exchanger 22, a resistivity meter 24, a flow switch 25 and preferably a de-ionizing filter 26 are arranged along the fluid pathway to the anode inlet port 202 from the oxygen collection device 20. The second heat exchanger 22 is also coupled to receive a regulation signal from the first temperature sensor 31 arranged on the fluid pathway originating from the anode outlet port 27.

The circulation pump 23 is operable to force the flow of water into the electrolyzer cell stack 11. In some embodiments, the circulation pump is of a high-temperature/high-pressure type, and is constructed with materials such as Teflon® or Peek®. Using the regulation signal from the first temperature sensor 31, the second heat exchanger 22 is operable to adjust the temperature of the water stream entering the electrolyzer cell stack 11. The resistivity meter 24 is operable to measure the resistivity of the water flowing into the electrolyzer cell stack 11. The flow switch 25 is operable to send an alarm signal to a central and/or local distributed control system if the water level is too low. In some embodiments, the de-ionizing filter 26 incorporates organic and particulate filtering functions.

As a side note, in different embodiments the first and second heat exchangers 38, 22 are made up of different components. For example, in one embodiment the first and second heat exchangers 38, 22 include fans for temperature regulation by air-cooling, whereas in other embodiments the first and second heat exchangers 38, 22 include pumps and coolant fluids for temperature regulation by liquid-cooling. Those skilled in the art will generally appreciate that a heat exchanger can be embodied in a number of different forms, but in each embodiment the function of a heat exchanger is to serve as a temperature regulation means.

There are also a number of balance-of-plant elements arranged along the fluid pathway from the water supply tank 16 to the oxygen collection device 20. Specifically, the water supply tank 16 is connected to the oxygen collection device 20 through a fill pump 17, an organic filter 18, a particulate and a de-ionizing filter 19, a check valve 47 and a three-way valve 21. An output of the three-way valve 21 is also coupled back to the water supply tank 16. The check valve 47 is arranged to prevent back flow of water through the fill pump 17 and filters 18, 19.

A first water level indicator 37 is coupled to the oxygen collection device 20 and to the fill pump 17 and the three-way valve 21. The first water level indicator 37 is operable to measure the water level in the oxygen collection device 20 and provide a feedback control signal to the fill pump 17 and the three-way valve 21. For example, when the water level in the oxygen collection device 20 is higher than a pre-set high level value, the three-way 21 valve is set to re-circulate water back to the water supply tank 16; or, when the water level is lower than a pre-set low level value, the fill pump 17 is signalled to increase the rate of water flow.

Comparatively, the balance-of-plant setup between the hydrogen collection device 39 and the water supply tank 16 is quite simple. A second water level indicator 45 is coupled to the hydrogen collection device 39 and a purge valve 46 is connected between the hydrogen collection device 39 and the water supply tank 16. The purge valve 46 is operated by a control signal received from the second water level indicator 45 coupled to the hydrogen collection device 39. When the water level in the hydrogen collection device 39 is higher than a pre-set level value, the purge valve 46 opens after receiving the control signal from the second water level indicator 45. Once the purge valve 46 is opened, water can flow from the hydrogen collection device 39 to the water supply tank 16. Alternatively, the purged water can be dumped out of the system or used for other purposes (i.e. as a coolant).

The hydrogen collection device 39 also has a safety valve 44 that automatically vents gas from the hydrogen collection device 39 when the pressure inside reaches a pre-set upper threshold. Accordingly, the safety valve 44 aids in the regulation of the hydrogen pressure, which in this embodiment, is followed by the oxygen pressure via the operation of the pressure following device 34.

In this particular embodiment, the output port 5 of the hydrogen collection device 39 is coupled to a combination of valves. Specifically, the output port 5 is coupled to a backpressure valve 40 that is in parallel with a normally open venting valve 41 that is arranged in series with a needle/orifice valve 42. The outputs of the backpressure valve 40 and the needle/orifice valve 42 are coupled in parallel into a check valve 43.

The backpressure valve 40 is arranged to regulate the hydrogen pressure within the hydrogen collection device 39 during the operation of the electrolyzer cell module 10*b*. The hydrogen is preferably stored in a large low-pressure (e.g. around 100 psi) tank having water drainage to remove whatever small amount of water that could still be present with the hydrogen. Alternatively, the hydrogen could be stored in low-pressure storage devices such as metal hydrides. The hydrogen could also be further compressed into higher-pressure storage vessels.

The normally open venting valve 41 is preferably closed during start-up and opens when the electrolyzer cell module 10*b* shuts down. The normally open valve 41 also functions as an emergency pressure relief path when the electrolyzer cell module 10*b* is suddenly stopped in emergency situations, which reduces the chances that any of the pumps in the electrolyzer cell modules 23 will be de-primed by the sudden formation of gas bubbles in the system.

The needle/orifice valve 42 is arranged after the normally open valve 41 to slowly lower the hydrogen pressure to the ambient pressure, after the electrolyzer cell module 10*b* is shut down, again, in order not to de-prime any of the circulation pumps. This is described in greater detail in U.S. patent application Ser. No. 10/944,868, which is hereby incorporated herein by reference.

The check valve 43 is arranged to prevent back flow into the hydrogen collection device 39 and isolate the hydrogen pressure from pressures downstream.

A hydrogen gas sensor 35 is arranged on the output port 4 of the oxygen collection device 20 to detect irregularly high levels of hydrogen in the oxygen stream, which may indicate that there is a leak somewhere in the system. The oxygen collection device 20 also has a safety valve 36 arranged to vent oxygen should the pressure inside reach a pre-set high value.

With continued reference to FIG. 3, the pressure following device 34 is arranged between the output port 4 of the oxygen collection device 20 and the hydrogen collection device 39. Specifically, the pressure following device 34 includes a pressure sensor connected to measure the hydrogen pressure in the hydrogen collection device 39, and a dome-loaded pressure valve, which is configured as a negative bias pressure regulator, that is connected to the output port 4 of the oxygen collection device 20. The pressure following device 34 measures/senses the hydrogen pressure and sets the oxygen pressure via control of the dome-loaded pressure valve.

In this particular embodiment, the hydrogen side of the electrolyzer cell stack 11 does not include a pump, and, accordingly the hydrogen pressure is primarily established using the backpressure valve 40. It is beneficial to the overall system efficiency to keep the hydrogen pressure relatively high in order to reduce the size of hydrogen gas bubbles, which will in turn increase the active reaction area and reduce the amount of current fed to the electrolyzer cell stack 11. Having smaller hydrogen bubbles improves efficiency and counteracts any decrease in efficiency caused by the relatively high pressure(s) of the system.

Figure 4:
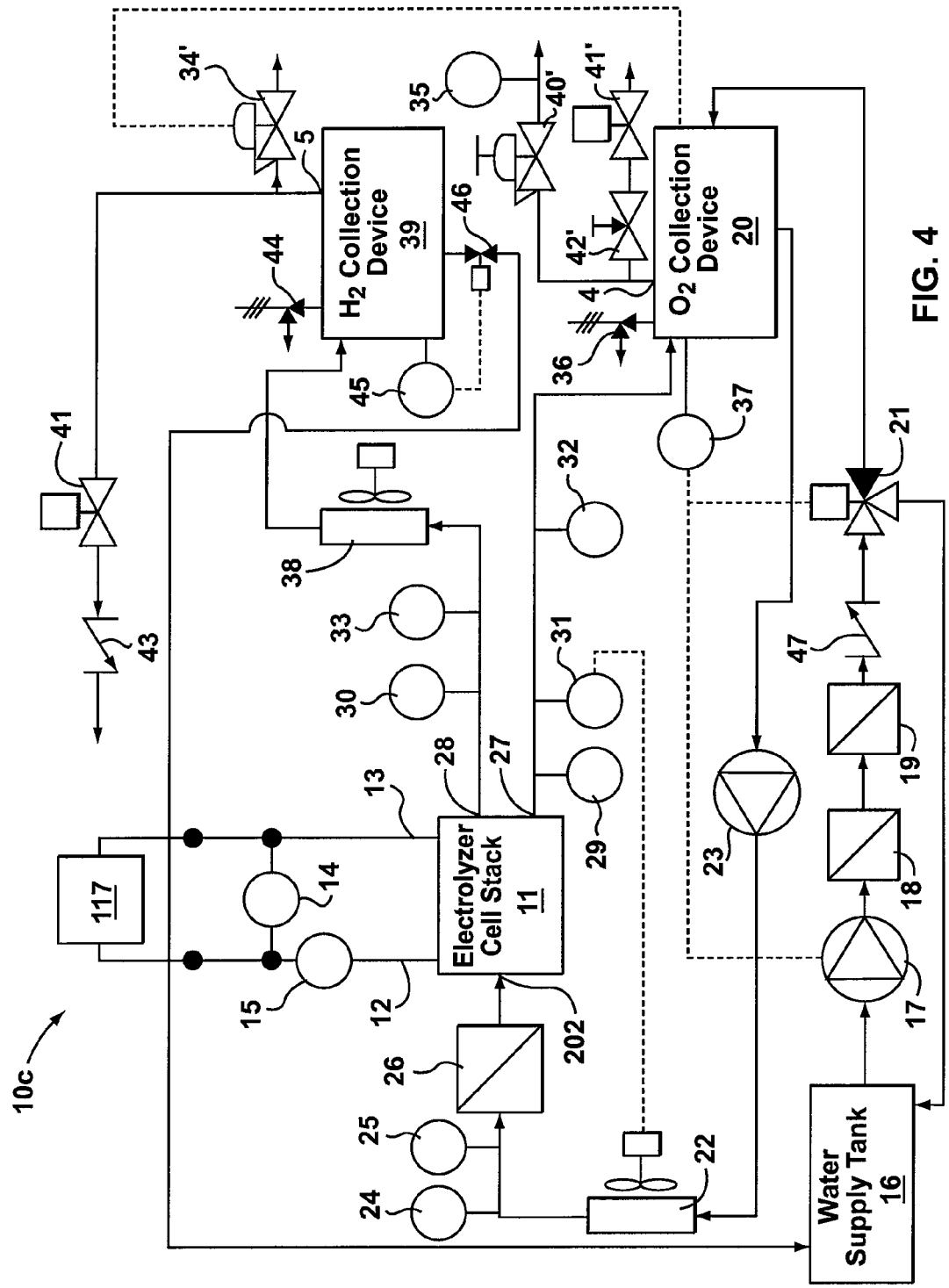
FIG. 4 is a second detailed schematic drawing of an electrolyzer cell module according to aspects of an alternative embodiment of the invention.

Referring now to FIG. 4, shown is an electrolyzer cell module 10*c*, which includes an alternative pressure following arrangement to that included in the electrolyzer cell module 10*b* shown in FIG. 3. Specifically, the electrolyzer cell module 10*c* is configured so that the hydrogen pressure follows the oxygen pressure, but remains higher. To this end, a pressure following device 34' is arranged between the output port 5 of the hydrogen collection device 39 and the oxygen collection device 20. The pressure following device 34' includes a pressure sensor connected to measure the oxygen pressure in the oxygen collection device 20, and a dome-loaded pressure valve, which is configured as a positive bias pressure regulator, that is connected to the output port 5 of the hydrogen collection device 39. As described above, the pressure following device 34' measures/senses the oxygen pressure and sets the hydrogen pressure via control of the dome-loaded pressure valve.

Again, those skilled in the art will appreciate that the electrolyzer cell module 10*b* also includes a controller (not shown) similar to the controller 90 illustrated in FIG. 2, which is connected to a suitable combination of elements; however, this controller has not been illustrated for the sake of simplicity.

Moreover, the output port 5 of the hydrogen collection device 39 is now only connected to the normally open venting valve 41 that is arranged in series with the check valve 43. The normally open venting valve 41 and the check valve 43 operate as described above. Additionally, the output port 4 of the oxygen collection device 20 is connected to a needle/orifice valve 42' that is further connected in series to another normally open valve 41'. The needle/orifice valve 42' and the normally open valve 41' operate to regulate the oxygen pressure during the operation of the electrolyzer cell module 10*c*.

Figure 5:
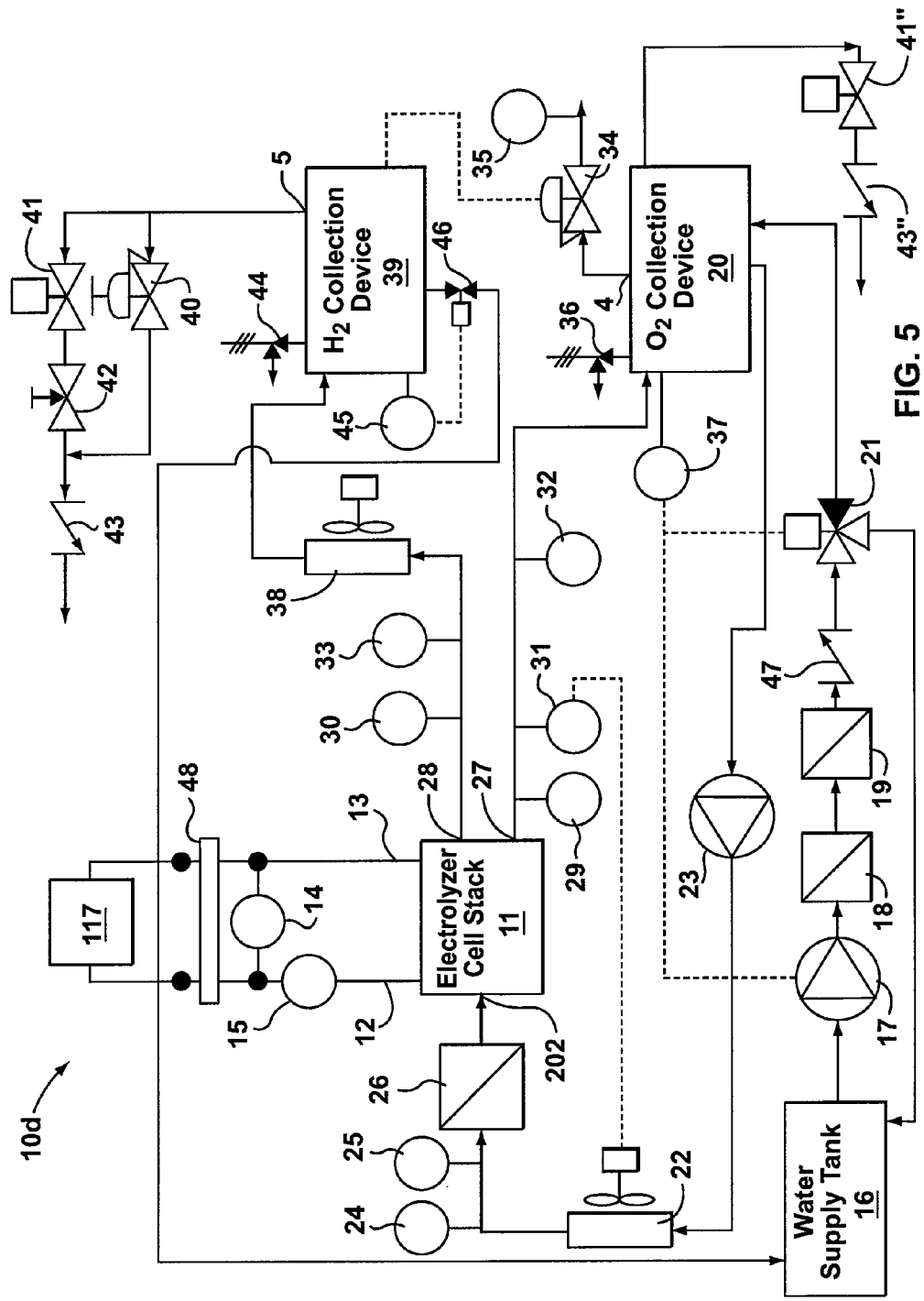
FIG. 5 is a third detailed schematic drawing of an electrolyzer cell module according to aspects of another alternative embodiment of the invention that is similar to the electrolyzer cell module illustrated in FIG. 3.

Referring now to FIG. 5, shown is an electrolyzer cell module 10*d*, which includes another alternative pressure following arrangement to that included in the electrolyzer cell module 10*b* (shown in FIG. 3). The electrolyzer cell module 10*d* (shown in FIG. 5) is almost identical to the electrolyzer cell module 10*b* (shown in FIG. 3), except that the pressure following device 34 includes a dome-loaded pressure valve that is configured as a positive bias pressure regulator, as opposed to the negative bias pressure regulator included in FIG. 3. The pressure following device 34 measures/senses the hydrogen pressure and sets the oxygen pressure via control of the dome-loaded pressure valve. However, since the dome-loaded pressure valve is a positive bias pressure regulator the resulting oxygen pressure will be set higher than the measured/sensed hydrogen pressure.

Additionally, the oxygen collection device 20 includes an output connected to another normally open valve 41" that is further connected in series to another check valve 43". The normally open valve 41" and the check valve 43" are used to regulate the oxygen pressure during the operation of the electrolyzer cell module 10*d*.

Figure 6:
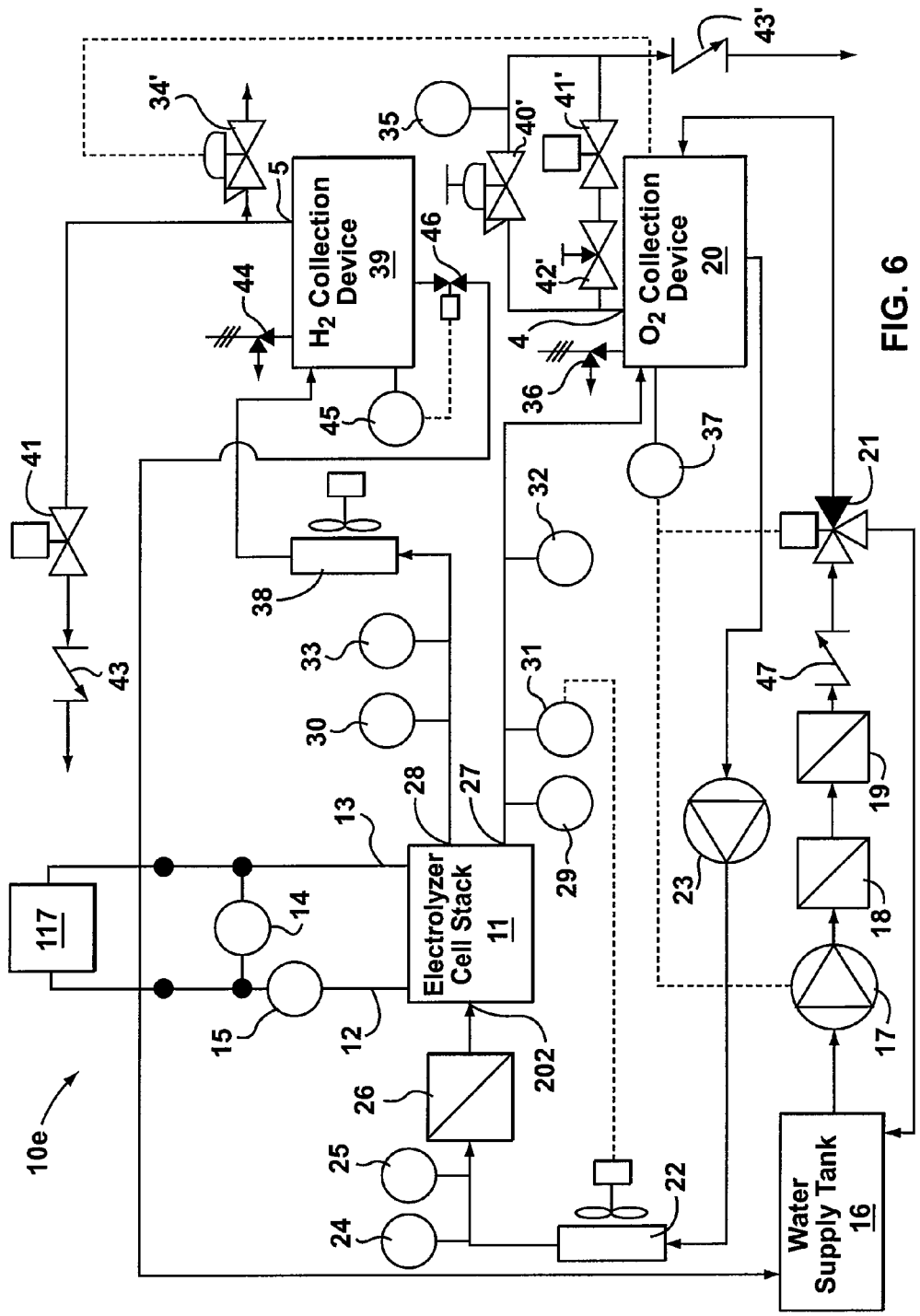
FIG. 6 is a fourth detailed schematic drawing of an electrolyzer cell module according to aspects of another alternative embodiment of the invention that is similar to the electrolyzer cell module illustrated in FIG. 4.

Referring now to FIG. 6, shown is an electrolyzer cell module 10*e*, which includes an alternative pressure following arrangement to that included in the electrolyzer cell module 10*c* shown in FIG. 4. The electrolyzer cell module 10*e* is configured so that the hydrogen pressure follows the oxygen pressure. To this end, a pressure following device 34' is arranged between the output port 5 of the hydrogen collection device 39 and the oxygen collection device 20. The pressure following device 34' includes a pressure sensor connected to measure the oxygen pressure in the oxygen collection device 20, and a dome-loaded pressure valve, which is configured as a negative bias pressure regulator, that is connected to the output port 5 of the hydrogen collection device 39. As described above, the pressure following device 34' measures/senses the oxygen pressure and sets the hydrogen pressure via control of the dome-loaded pressure valve.

Additionally, the output port 4 of the oxygen collection device 20 is coupled to a combination of valves. Specifically, the output port 4 is coupled to a backpressure valve 40' that is in parallel with a needle/orifice valve 42' that is arranged in series with a normally open venting valve 41'. The outputs of the backpressure valve 40' and the normally open venting valve 41' are coupled in parallel into a check valve 43'. This combination of valves connected to the output port 4 operates in a similar manner to combination of valves connected to the output port 5 of the electrolyzer cell module 10*b* shown in FIG. 3.

Figure 7A:
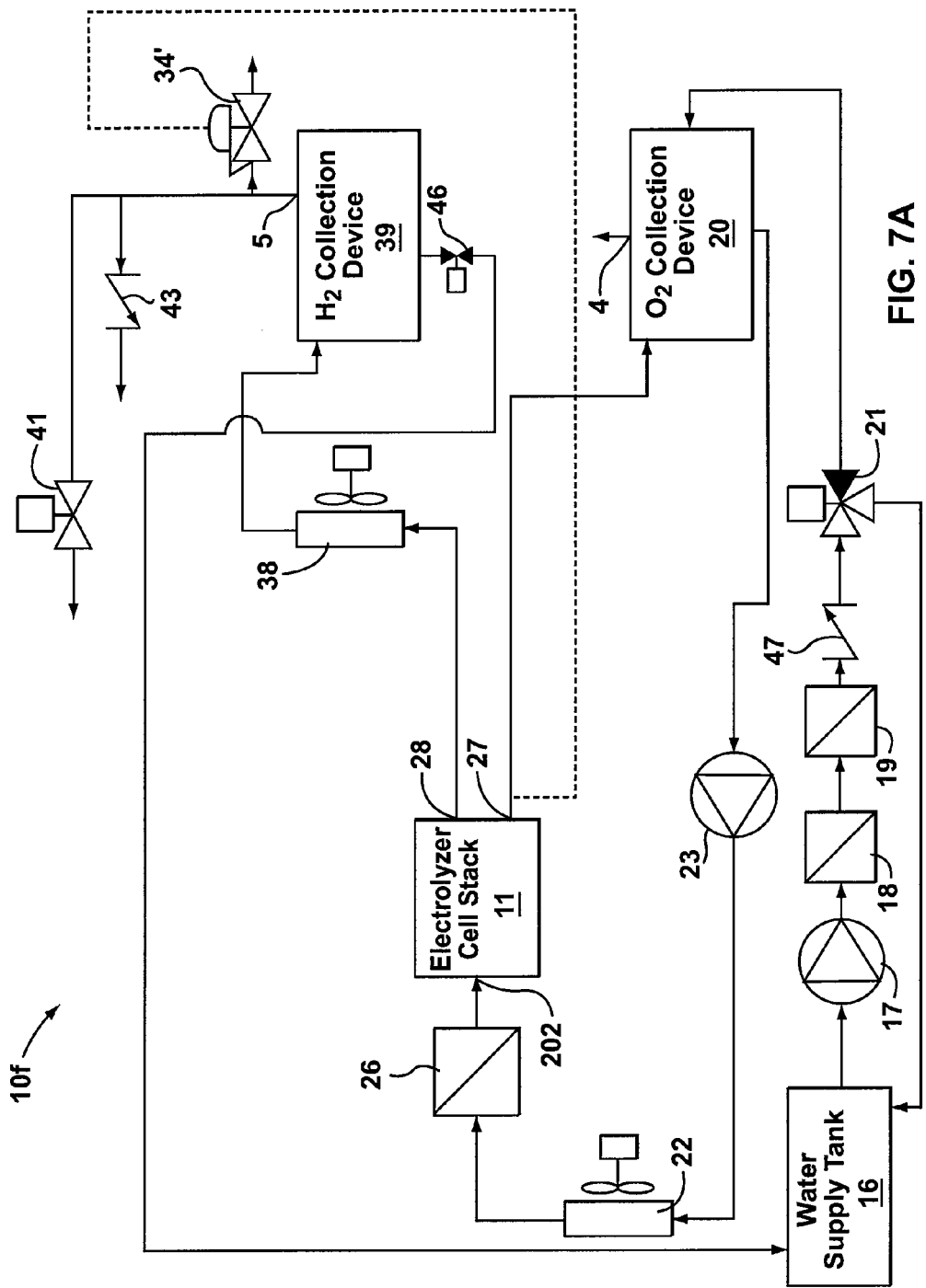
FIG. 7A is a fifth detailed schematic drawing of a portion of an electrolyzer cell module according to aspects of another alternative embodiment of the invention that is similar to the electrolyzer cell module illustrated in FIG. 4.
Figure 7B:
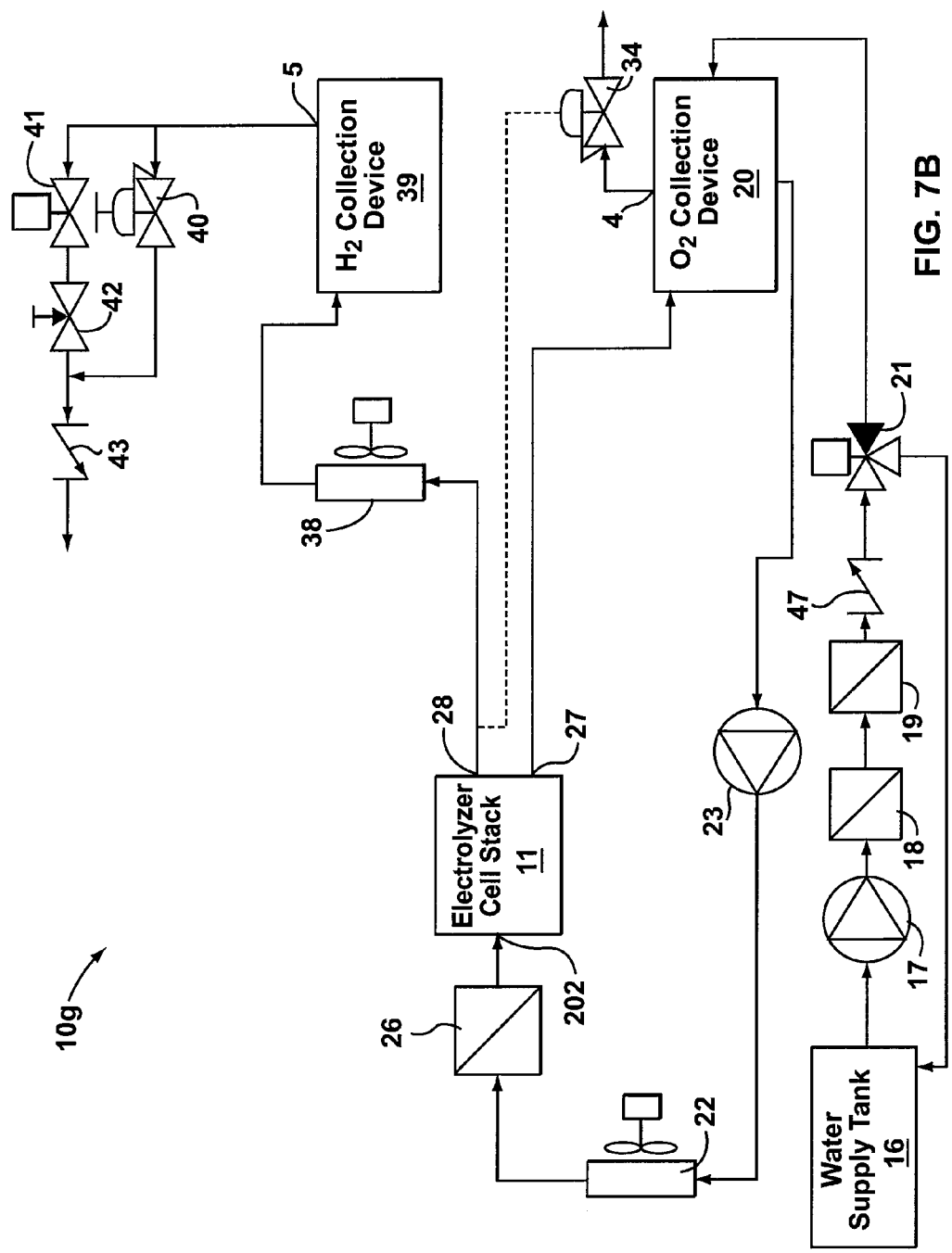
FIG. 7B is a sixth detailed schematic drawing of a portion of an electrolyzer cell module according to aspects of another alternative embodiment of the invention that is similar to the electrolyzer cell module illustrated in FIG. 3.
Figure 7C:
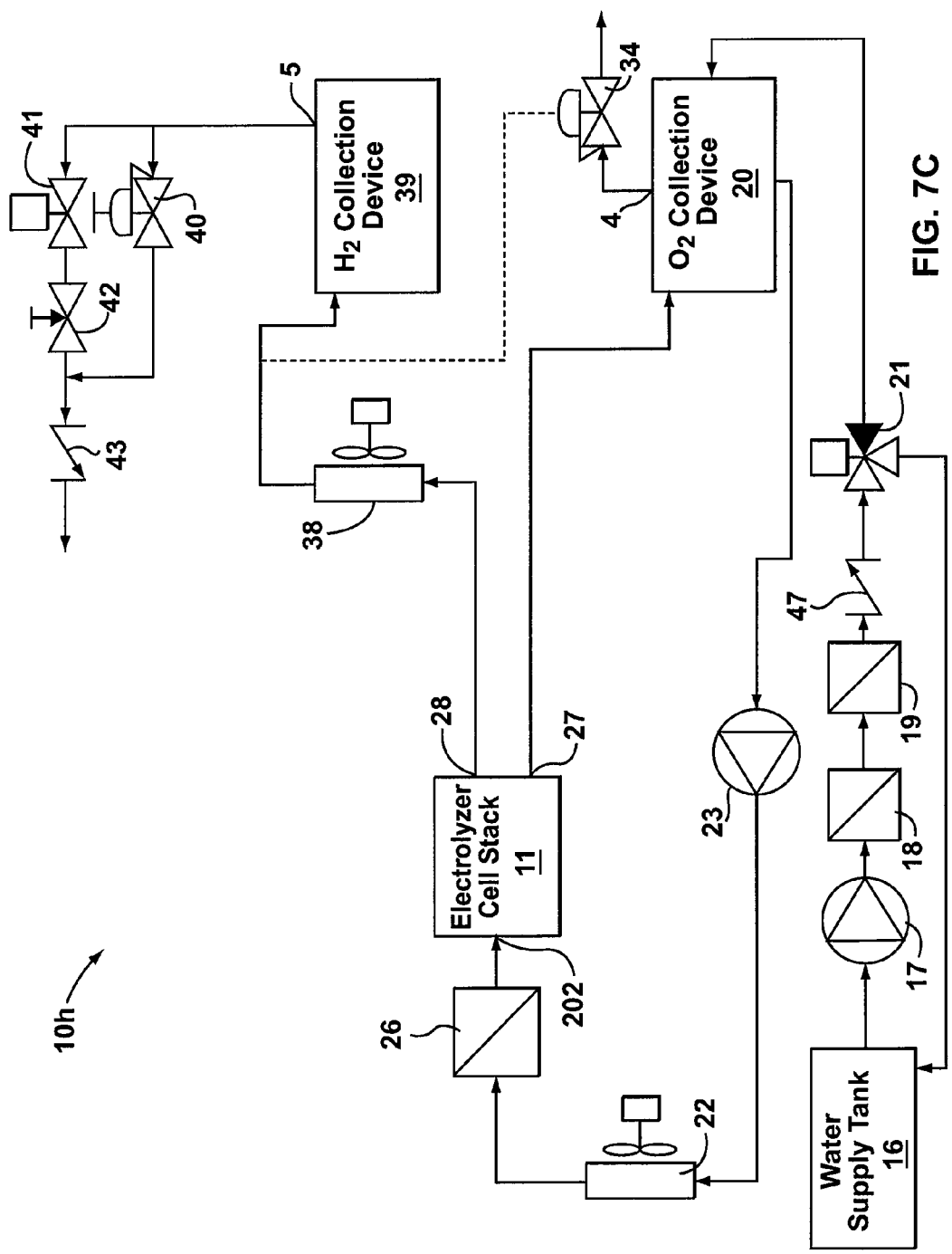
FIG. 7C is a seventh detailed schematic drawing of a portion of an electrolyzer cell module according to aspects of another alternative embodiment of the invention that is similar to the electrolyzer cell module illustrated in FIG. 3.

It was noted above that a pressure following device can be placed between at any two points around an electrolyzer cell stack that provide a reasonable measure of the internal pressures within the electrolyzer cell stack and a control point for those pressures so that the pressure differential across the membranes can be regulated. FIGS. 7A, 7B, 7C show partial detailed schematic drawings of electrolyzer cell modules 10*f*, 10*g* and 10*h*, respectively, that illustrate alternative pressure following arrangements according to aspects of different embodiments of the invention.

Referring specifically to FIG. 7A, the electrolyzer cell module 10*f*, is similar to the electrolyzer cell module 10*c* illustrated in FIG. 4. However, the pressure following device 34' is connected between the output port 5 and the anode outlet port 27 of the electrolyzer cell stack 11, and not to the oxygen collection device 20. In particular, a pressure sensor is arranged to measure/sense the pressure at the anode outlet port 27 instead of within the oxygen collection device 20.

Referring now to FIGS. 7B and 7C, the respective electrolyzer cell modules 10*g* and 10*h*, are similar to the electrolyzer cell module 10*b* illustrated in FIG. 3. However, the respective pressure following devices 34 are connected between the output port 4 and respective points before and after the first heat exchanger 38, and not to the hydrogen collection device 39. In particular, respective pressure sensors are arranged to measure/sense the pressure at respective points following the cathode outlet port 28 instead of within the hydrogen collection device 39.

While the above description provides examples according to aspects of embodiments of the invention, it will be appreciated that the present invention is susceptible to modification and change without departing from the fair meaning and scope of the accompanying claims. Accordingly, what has been described is merely illustrative of the application of some aspects of embodiments of the invention. It is therefore to be understood that within the scope of the appended claims, the invention may be practiced otherwise than as specifically described herein.

We claim:

1. A balance-of-plant system, suited for regulating the operation of an electrolyzer cell stack having at least one electrolyzer cell having a first output port for a first reaction product and a second output port for a second reaction product, at least one of the first and second output ports being for supply of one of the reaction products as a gas for use, the balance-of-plant system comprising:
   a first pressure regulator for regulating a first pressure of the first reaction product;
   a pressure following device for regulating a second pressure of the second reaction product relative to the first pressure, the pressure following device consisting essentially of a pressure actuated valve connected to the second output port,
   wherein the second pressure follows, and is changed only in response to, changes in the first pressure.

2. The balance-of-plant system according to claim 1, wherein the first and second pressures correspond to pressures of hydrogen and oxygen, respectively, produced by the electrolyzer cell stack.

3. The balance-of-plant system according to claim 2, further comprising a hydrogen collection device, and wherein the first pressure regulator is configured to control the pressure of hydrogen within the hydrogen collection device.

4. The balance-of-plant system according to claim 3, further comprising an oxygen collection device, and wherein the pressure following device is located downstream of the oxygen collection device and connected in fluid communication with the hydrogen collection device such that the pressure activated valve is activated by the pressure of hydrogen collection device.

5. The balance-of-plant system according to claim 4, wherein the pressure actuated valve sets the pressure of oxygen relative to the pressure of hydrogen within the hydrogen collection device.

6. The balance-of-plant system according to claim 5, wherein the pressure actuated valve is configured as a negative bias pressure regulator, so that the pressure of oxygen is set lower than the pressure of hydrogen.

7. The balance-of-plant system according to claim 5, wherein the pressure actuated valve is configured as a positive bias pressure regulator, so that the pressure of oxygen is set higher than the pressure of hydrogen.

8. The balance-of-plant system according to claim 1, wherein the first and second pressures correspond to pressures of oxygen and hydrogen, respectively, produced by the electrolyzer cell stack.

9. The balance-of-plant system according to claim 8, further comprising an oxygen collection device, and wherein the first pressure regulator is configured to control the pressure of oxygen within the oxygen collection device.

10. The balance-of-plant system according to claim 9, further comprising a hydrogen collection device, and wherein the pressure following device is located downstream of the hydrogen collection device and connected in fluid communication with the oxygen collection device such that the pressure actuated valve is actuated by the pressure of the oxygen collection device.

11. The balance-of-plant system according to claim 10, wherein the pressure actuated valve sets the pressure of hydrogen relative to the pressure of oxygen within the oxygen collection device.

12. The balance-of-plant system according to claim 11, wherein the pressure actuated valve is configured as a negative bias pressure regulator, so that the pressure of hydrogen is set lower than the pressure of oxygen.

13. The balance-of-plant system according to claim 11, wherein the pressure actuated valve is configured as a positive bias pressure regulator, so that the pressure of hydrogen is set higher than the pressure of oxygen.

14. An electrochemical cell stack module comprising:
at least one electrochemical cell;
a first output port for a first reaction product at a first pressure and a second output port for a second reaction product at a second pressure, at least one of the first and second output ports being for supply of one of the reaction products as a gas for use, wherein the first and second pressures are controllable;
a first pressure regulator for regulating the first pressure of the first reaction product; and
a pressure following device that is operable to control the second pressure relative to the first pressure, the pressure following device consisting essentially of a pressure actuated valve connected to the second output port,
wherein the second pressure follows the first pressure at a predetermined positive or negative bias relative to the first pressure.

15. An electrochemical cell stack according to claim 14, wherein the at least one electrochemical cell is an electrolyzer cell and, the first pressure corresponds to hydrogen pressure and the second pressure corresponds to oxygen pressure.

16. An electrochemical cell stack according to claim 14, wherein the at least one electrochemical cell is an electrolyzer cell, and the first pressure corresponds to oxygen pressure and the second pressure corresponds to hydrogen pressure.

17. An electrolyzer cell stack according to claim 14, wherein the first pressure is set relative to the second pressure such that the second pressure is one of greater than and less than the first pressure.

18. The electrochemical cell stack according to claim 14, further comprising:
a first collection device for the first reaction product; and
a second collection device for the second reaction product.

19. The electrochemical cell stack according to claim 18, wherein the first pressure regulator is arranged to regulate the first pressure within the first collection device.

20. The electrochemical cell stack according to claim 19, wherein the pressure following device is located downstream of the second collection device and connected in fluid communication with the first collection device such that the pressure activated valve is activated by pressure in the first collection device.

21. The electrochemical cell stack according to claim 20, wherein the pressure actuated valve is configured as a negative bias pressure regulator, so that the second pressure is set lower than the first pressure.

22. The electrochemical cell stack according to claim 20, wherein the pressure actuated valve is configured as a positive bias pressure regulator, so that the second pressure is set higher than the first pressure.

23. An electrolyzer cell module comprising:
an electrolyzer cell stack comprising a cathode outlet port and an anode outlet port;
hydrogen collection device connected to the cathode outlet port;
an oxygen collection device connected to the anode outlet port;
a first pressure regulator connected to one of the collection devices and configured to control a pressure within the one of the collection devices; and
a pressure following device located downstream of the other collection, the pressure following device comprising a pressure actuated valve connected in fluid communication with the one of the collection devices so as to directly sense the pressure in the one of the collection devices and configured to follow only a pressure within the other of the collection devices.

* * * * *